United States Patent
Maurer

(10) Patent No.: US 10,443,500 B2
(45) Date of Patent: Oct. 15, 2019

(54) COMBUSTOR COOLING STRUCTURE

(71) Applicant: ANSALDO ENERGIA SWITZERLAND AG, Baden, OT (CH)

(72) Inventor: Michael Thomas Maurer, Bad Säckingen (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 120 days.

(21) Appl. No.: 14/514,684

(22) Filed: Oct. 15, 2014

(65) Prior Publication Data
US 2015/0107262 A1 Apr. 23, 2015

(30) Foreign Application Priority Data
Oct. 17, 2013 (EP) .................................... 13189106

(51) Int. Cl.
*F02C 7/18* (2006.01)
*F01D 9/02* (2006.01)
(Continued)

(52) U.S. Cl.
CPC ............... *F02C 7/18* (2013.01); *F01D 9/023* (2013.01); *F01D 25/12* (2013.01); *F23M 5/085* (2013.01);
(Continued)

(58) Field of Classification Search
CPC ............. F23R 3/42; F23R 2900/03044; F23R 2900/03043; F23R 2900/03341;
(Continued)

(56) References Cited

U.S. PATENT DOCUMENTS 4,719,748 A * 1/1988 Davis, Jr. ................ F01D 5/187
60/39.37
5,906,095 A * 5/1999 Frutschi ................ F01K 21/042
60/39.182
(Continued)

FOREIGN PATENT DOCUMENTS

CN 102011651 A 4/2011
DE 103 12 971 A1 12/2004
(Continued)

OTHER PUBLICATIONS

Office Action dated Dec. 18, 2017, by the Chinese Patent Office in corresponding Chinese Patent Application No. 201410551379.5, and a partial English Translation of the Office Action. (12 pages).

*Primary Examiner* — Craig Kim
*Assistant Examiner* — Katheryn A Malatek
(74) *Attorney, Agent, or Firm* — Buchanan Ingersoll & Rooney PC

(57) ABSTRACT

The invention refers to a transition piece of a combustor of a gas turbine including an impingement cooling zone, a sequential disposed liner having at least one cooling arrangement and a closing plate with respect to the sequential disposed liner. The sequential disposed liner has a cooling channel structure. The cooling channel structure forms a closed loop cooling scheme or a quasi-closed loop cooling scheme. The cooling channel structure is operatively connected to a cooling medium to cool at least one part of the sequential disposed liner.

13 Claims, 4 Drawing Sheets

(51) Int. Cl.
  *F01D 25/12* (2006.01)
  *F23M 5/08* (2006.01)
  *F23R 3/00* (2006.01)
  *F23R 3/42* (2006.01)

(52) U.S. Cl.
  CPC ............... *F23R 3/002* (2013.01); *F23R 3/42* (2013.01); *F05D 2260/201* (2013.01); *F05D 2260/202* (2013.01); *F23R 2900/03043* (2013.01); *F23R 2900/03044* (2013.01)

(58) Field of Classification Search
  CPC .. F23R 3/002; F01D 9/023; F02C 7/18; F05D 2260/201–203
  See application file for complete search history.

(56) References Cited

U.S. PATENT DOCUMENTS

| | | | |
|---|---|---|---|
| 6,412,268 B1 * | 7/2002 | Cromer | F01D 9/023 60/760 |
| 8,707,705 B2 | 4/2014 | Berry et al. | |
| 2011/0048030 A1 * | 3/2011 | Berry | F01D 9/023 60/806 |

FOREIGN PATENT DOCUMENTS

| | | |
|---|---|---|
| EP | 0 321 809 A1 | 6/1989 |
| EP | 0 620 362 A1 | 10/1994 |
| EP | 0 704 657 A2 | 4/1996 |
| EP | 1 143 107 A2 | 10/2001 |
| EP | 2 230 456 A2 | 9/2010 |
| GB | 2 200 738 A | 8/1988 |

* cited by examiner

GAS TURBINE

COMBUSTOR COOLING STRUCTURE

CROSS-REFERENCE TO RELATED APPLICATIONS

This application claims priority to European application 13189106.1 filed Oct. 17, 2013, the contents of which are hereby incorporated in its entirety.

TECHNICAL FIELD

The present invention relates to an internally cooled combustor turbine interface for a rotary machine, preferably a gas turbine engine.

The invention refers fundamentally to a transition piece of a combustor of a gas turbine, comprising an impingement cooling zone, a sequential disposed liner having at least one cooling arrangement, a closing plate with respect to the sequential disposed liner, wherein the sequential disposed liner having a cooling channel structure, wherein the cooling channel structure forms a closed loop cooling scheme or a quasi-closed loop cooling scheme, and wherein the cooling channel structure being operatively connected to a cooling medium to cool at least one part of the sequential disposed liner.

BACKGROUND

It is known practice for selected gas turbine engine components, especially in the combustor turbine interface, to be internally air cooled by a supply of air bleed from a compressor offtake. Such cooling is necessary to maintain combustor component temperatures within the working range of the materials from which they are constructed.

With reference to EP 2 230 456 A2, FIGS. 1 and 2, a typical gas turbine includes a transition piece by which the hot combustion gases from an upstream combustor as represented by the combustor liner are passed to the first stage of a turbine represented at item 14. Flow from the gas turbine compressor exits an axial diffuser and enters into a compressor discharge case. About 50% of the compressor discharge air passes through apertures formed along and about a transition piece impingement sleeve for flow in an annular region or annulus (or, second flow annulus) between the transition piece and the radially outer transition piece impingement sleeve. The remaining approximately 50% of the compressor discharge flow passes into flow sleeve holes of an upstream combustion liner cooling sleeve and into an annulus between the cooling sleeve and the liner and eventually mixes with the air in annulus. This combined air eventually mixes with the gas turbine fuel in a combustion chamber.

According to EP 2 230 456 A2, FIG. 4, each stub may include one or a plurality of cooling passages disposed substantially surrounding the cooling hole. The cooling passages are preferably oriented at an angle [alpha] relative to an axis (represented by arrow item 54) of the cooling hole in a direction corresponding to a hot gas flow direction (represented by arrow item 56) through the liner. That is, as shown in FIG. 4, the cooling passages are angled relative to axis of the cooling holes, so that the cooling air through cooling passages has at least a directional component in the same direction as the hot gas flow direction through the liner. With the angled cooling passages, it is preferred to include two rows of angled passages through the stub to push the hot gases away from the liner wall. The angle can be any angle up to about 30°, beyond which the air flowing through the cooling passages may have difficulty pushing the hot gases away from the liner wall.

Generally, higher engine gas temperature have led to increased cooling bleed requirements resulting in reduced cycle efficiency and increased emission levels. To date, it has been possible to improve the design of cooling systems to minimize cooling flow at relative low cost. In future engine temperatures will increase to levels at which it is necessary to have complex cooling features to maintain low cooling flows.

SUMMARY

It is an object of the invention to realize a closed loop cooling scheme or a quasi-closed loop cooling to cool at least one combustor of a combustion turbine interface.

The basic idea of the present invention includes the fact that any air that is bypassed around the combustion process is hazardous from gas turbine emission point of view. The turbine inlet temperature is the driving temperature for the engine performance. Leakages and cooling air, which is not participating in the combustion process, have to be compensated by a higher flame temperature to achieve the same turbine inlet temperature.

Typically, cooling concepts at the turbine interface between transition piece and turbine inlet use cooling air which is directly ejected into the hot gas path. Thus, the emissions of such a cooling concept are higher compared to a closed loop cooling concept. Realizing a closed loop cooling concept at the turbine interface between combustor and turbine inlet involves an inventive step according to the present invention.

Basically, the inventive concept comprises the features that near-wall cooling channels are applied in the wall of the transition piece at the interface to the picture frame, also called closing plate, as indicated in FIG. 1. The cooling channels could be drilled in or eroded, or the cooling path could be produced by SLM (Selective Laser Melting) or could be realized by a multi-layer design that is brazed together at the interface. The proposed cooling path is realized by creating openings of these near-wall cooling channels to the outer combustor air plenum and openings to the space inside impingement chamber. The individual cooling channels, which run in a serpentine manner, are connected via a slot that is drilled in the closing plate. With this arrangement a driving pressure drop over the cooling channels can be created to drive the cooling medium(s) without leaking directly into the combustion chamber as indicated in the Figures below showed.

Another advantage of the present invention consists in the fact that cooling process assumes a self-healing character. In case the junction between the transition piece of the turbine combustor and closing plate is lost, cooling medium will be injected into the combustion chamber. The lifetime of the component will not be endangered or self-endangering, as the cooling system will not brake-down. The same is true for partial blockage of individual openings, as the slot in the closing plate will allow the system to redistribute some cooling medium into the neighboring channels.

On the side of the closing plate the channels redistribute the cooling among one another being actively connected to a an annular space, optionally formed as a recess, and the recess comprising optionally in the circumferential direction at least one cavity.

The mentioned cavity comprising also at least one aperture through which inspection of the interior of the recess is made possible. The aperture is dimensioned in such a manner that it simultaneously forms a dust discharge aperture for dust or dirt particles contained in the cooling medium. By a "dust discharge aperture" there is to be understood here an aperture in the wall of the component by means of which particles entrained in the cooling medium emerge from the interior of the component due to their inertia. A dust discharge aperture must therefore inevitably be arranged at a deflection of the annular space conducting the cooling medium or at the end of a dust cavity branching from this annular space at a corresponding deflection. Such dust discharge apertures are already used in components of flow machines in order to prevent a blockage of the antecedent cooling channel paths. Particles entering with the cooling air are conveyed, due to the cooling force directly in a straight line radially to this cavity and this dust discharge aperture or hole, while nearly dirt-free air can enter the other serpentine channels without problems. The dust particles are thus conducted out of the cavity through this dust discharge aperture or this dust hole, so that the cooling air bores proper cannot be blocked by the dust particles. The dust hole can fulfill the function of dust discharge apertures, or that dust discharge apertures, by suitable dimensioning, particularly enlargement, can serve as inspection access apertures. The dust discharge apertures are here designed in size and position both so that dust is favorably discharged and also an aperture with sufficient diameter is formed in order to be able to introduce a bore-scope through this aperture. In order to be able to inspect these arrangements even in the built-in state of the machine, these inspection and dust discharge apertures are to be arranged approximately parallel to the machine axis, if the inspection tool is to be introduced in the hot gas path of the gas turbine. If the inspection tool is to be introduced radially into the machine, a position at the arrangement tip is more favorable in which the inspection and dust discharge aperture runs radially of the machine axis. By the combination according to the invention of the dust discharge and the inspection function in one and the same aperture, unnecessary apertures are avoided which can lead to an undesired loss of cooling medium and thus bring about a loss of efficiency.

The above mentioned final introduction of the cooling medium into the impingement cooling process is advantageous for the whole cooling concept of the turbine:

The widely thermal spent or quasi-spent cooling air from the cooling channels can also be used to increase the effect of the impingement cooling due to a transversal momentum.

An advantageous impingement cooling comprising a baffle cooling for wall parts, in which, firstly, the flow-off of the cooling medium transversely to the jet direction does not impair the jet effect. This is achieved by means of a multiplicity of baffle tubes which are arranged with their inlet over an area on a plane or curved carrier and which are directed with their outlet towards the wall part to be cooled, the carrier being arranged at a distance from the wall part. Secondly, through the axial inflow of the cooling medium in this zone is achieved that the baffle jets deflected after the impact can now flow off unimpeded in the free interspace between the baffle-tube outlet and the carrier located at a distance corresponding to the length of the baffle tubes.

The advantages of the present provisions are to be seen inter alia in that, now, an intensive cooling with the smallest possible quantity of cooling medium and with a low pressure drop is achieved. This in turn affords the possibility of implementing the classic baffle film arrangements with an enlarged film area. The film hole rows can then, in the case of flow-round components, be arranged at the locations having a lower external pressure.

Moreover, if the cooling medium circulates in a closed circuit, higher cooling pressures can be brought about, with the result that the heat transmission coefficient can be increased. This is the case inter alia when steam is used as the cooling medium, this becoming possible in combination installations. An advantage of this is that the higher pressure of the cooling medium is then generated beneficially in energy terms in the feed pump instead of in the compressor.

The above described closed loop cooling can as necessary converted to a semi closed loop cooling, by introducing an effusion cooling on the basis of the direction of the cooling air flow in the channels.

The arrangement comprising flowing cooling air from outside of the burner wall through effusion holes in the burner wall into an interior of the combustion chamber. Additionally, the cooling air, on the outside of the burner wall, can be deflected in its flow direction by means of deflection elements.

Accordingly, the cooling air is deflected in a directed manner on the outside of the burner wall in its flow direction by means of deflection elements which are in a distributed arrangement alongside of the channels. As a result, the effusion cooling can be virtually "tailored" in order to intensify its effect in specified regions of the combustion chamber. The use of deflection elements enables a greatly improved adjustment of the direction of the injected effusion cooling air. As a result, the flow conditions inside the combustion chamber are optimized, which, when considering the stability of combustion of reactive fuels, benefits operational reliability.

The deflection elements allow a more intensely concentrated effusion cooling of the combustion chamber in their region. The deflection elements can be attached directly on the outer surface of the channels. They can have the form of a halved spherical half-shell and thereby resemble an orchestra shell. The height and width of the semicircle-like opening of the deflection elements can be varied as a function of the diameter and spacing of the effusion holes which are covered by it. The number and the positioning of the deflection elements depend upon the design of the combustion chamber. The orientation of the deflection elements (e.g., the alignment of their openings) can be selected so that the maximum cooling air flow is deflected into the effusion holes. The deflection elements can be produced and fastened either individually or produced together in the form of a correspondingly stamped and/or embossed plate. The deflection elements can be welded or cast on channels. The number and diameter of the effusion holes can also be adapted to the positions of the deflection elements.

The cooling channels are applied in the wall of the transition piece of the combustor in one or more circumferentially subsequently disposed section on the transition piece. The circumferentially disposed channel section may also be intermediately broken or overlaid with an adjacent section. The cooling channels, which extend through the thickness of the liner of the transition piece, can have any suitable cross-sectional size or shape. For instance, the channels can be circular, oval, slotted, rectangular, triangular, or polygonal.

The closed loop cooling with or without an additional effusion cooling described above is not restricted to combustion turbine interface of simple gas turbines, which are using one combustor, but other constellations are possible, namely:

The gas turbine comprises essentially at least one compressor a first combustor which is connected downstream to the compressor. The hot gases of the first combustor are admitted at least to an intermediate turbine or directly or indirectly to a second combustor. The hot gases of the second combustor are admitted to a further turbine or directly or indirectly to an energy recovery, for example to a steam generator.

A can-architecture is also given, when an annular first and/or second combustion chamber having or comprising to each burner in flow direction an independent can or a separating flow combustion area which is wall-isolated from each other of the adjacent combustion areas.

It is also possible that at least one combustor runs under a caloric combustion path having a can-architecture, and wherein the air ratio ($\lambda$) of the combustion at least of the second combustor is kept below a maximum air ratio ($\lambda_{max}$).

Accordingly, the first and/or second combustor is designed as a can-architecture, while the remaining combustor or both combustors can be designed as an annular combustion chamber.

Moreover, in the conventional concept all can combustors are intended to run at the same firing temperatures and therefore (assuming similar air distribution, and leakage status) at the same CO emissions. This is in general not valid due to misdistribution of flows between the cans, manufacturing tolerances, etc. In order to make CO reduction the most effective preferable those can combustors shall be turned off, which show the lowest temperature at the second combustor inlet, since those combustors are expected to show larger CO emissions, compared to the other burners. This more advanced setup is expected to result in even lower CO emissions, while the gas turbine operation concept and fuel distribution system gets more complicated.

The proposed closed loop cooling concept can be utilized to work for a transition piece of a combustor of a gas turbine, which runs under sequential combustion (with or without a high pressure turbine) in a can-architecture, but not only. Referring to a sequential combustion the combination of combustors can be disposed as follows:

At least one combustor is configured as a can-architecture, with at least one operating turbine.

Both, the first and second combustors are configured as sequential can-can architecture, with at least one operating turbine.

The first combustor is configured as an annular combustion chamber and the second combustor is built-on as a can configuration, with at least one operating turbine.

The first combustor is configured as a can-architecture and the second combustor is configured as an annular combustion chamber, with at least one operating turbine.

Both, the first and second combustor are configured as annular combustion chambers, with at least one operating turbine.

Both, the first and second combustor are configured as annular combustion chambers, with an intermediate operating turbine.

If premix burners for the combustor of the gas turbine are provided, these should preferably be formed by the combustion process and objects according to the documents EP 0 321 809 A1 and/or EP 0 704 657 A2, wherein these documents forming integral parts of the present description.

In particular, said premix burners can be operated with liquid and/or gaseous fuels of all kinds. Thus, it is readily possible to provide different fuels within the individual cans. This means also that a premix burner can also be operated simultaneously with different fuels.

The second or subsequent combustor can is preferably carried out by EP 0 620 362 A1 or DE 103 12 971 A1, wherein these documents forming integral parts of the present description.

Additionally, the following mentioned documents forming also integral parts of the present description:

EP 0 321 809 A1 relating to a burner consisting of hollow part-cone bodies making up a complete body, having tangential air inlet slots and feed channels for gaseous and liquid fuels, wherein in that the center axes of the hollow part-cone bodies have a cone angle increasing in the direction of flow and run in the longitudinal direction at a mutual offset. A fuel nozzle, which fuel injection is located in the middle of the connecting line of the mutually offset center axes of the part-cone bodies, is placed at the burner head in the conical interior formed by the part-cone bodies.

EP 0 704 657 A2 and B1, relating to a burner arrangement for a heat generator, substantially consisting of a swirl generator, substantially according to EP 0 321 809 A1 and B1, for a combustion air flow and means for injection of fuel, as well as of a mixing path provided downstream of said swirl generator, wherein said mixing path comprises transaction ducts extending within a first part of the path in the flow direction for transfer of a flow formed in said swirl generator into the cross-section of flow of said mixing path, that joins downstream of said transition ducts.

BRIEF DESCRIPTION OF THE DRAWINGS

The invention shall subsequently be explained in more detail based on exemplary embodiments in conjunction with the drawing. In the drawing

DETAILED DESCRIPTION

Figure 1:
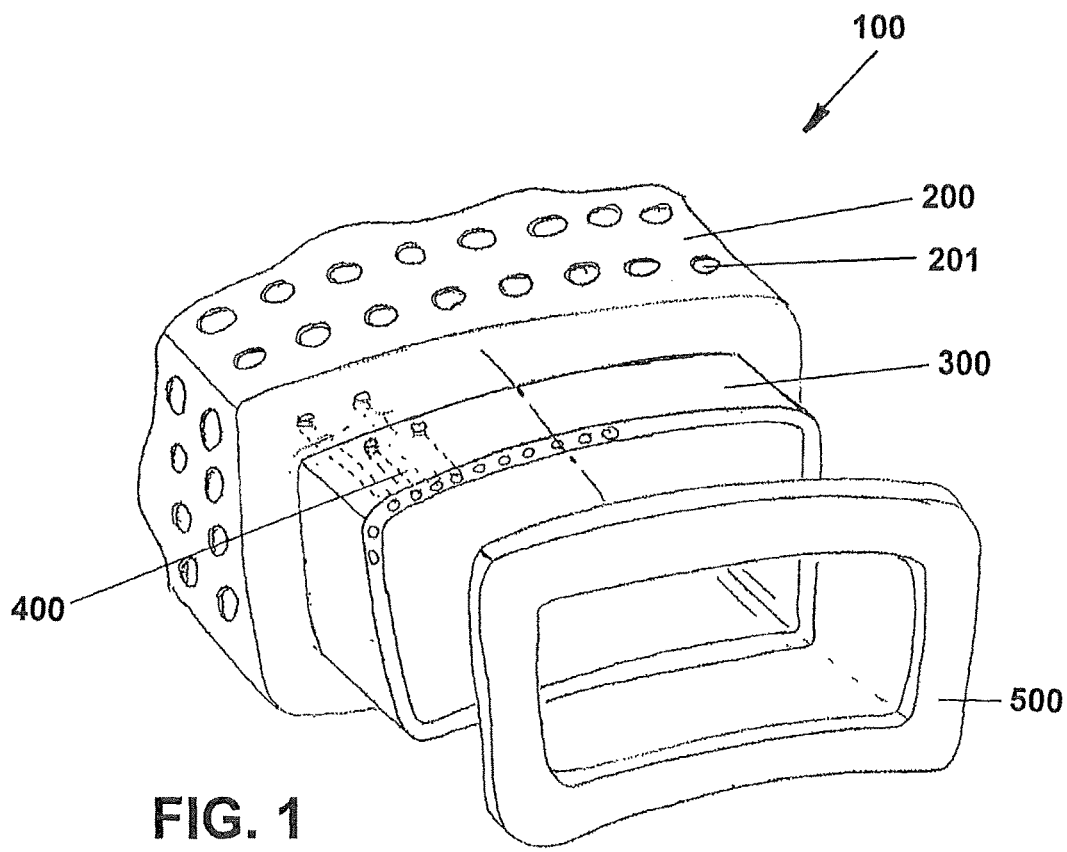
FIG. 1 shows a perspective view of a transition piece of a combustor.

FIG. 1 shows a transition piece 100 of a combustor of a gas turbine. The showed transition piece comprising an impingement cooling zone or section 200, which is provided with impingement cooling holes 201. The sequential disposed liner 300 comprising a cooling channel structure 400 and, finally, the ending of the sequential liner 300 is formed by a closing plate 500.

Figure 2:
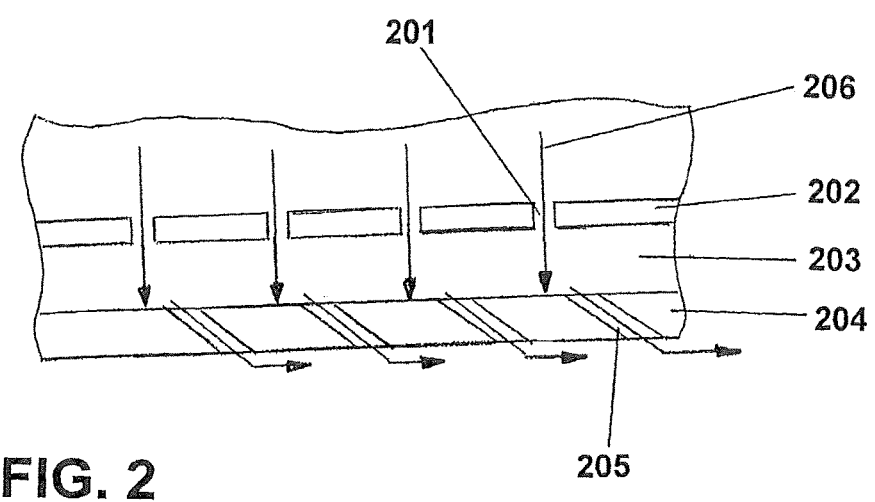
FIG. 2 shows a typical impingement cooling arrangement as a detailed cross sectional view showing a sidewall of a sequential liner and an impingement plate attached to the sidewall.

FIG. 2 shows a typical impingement cooling arrangement as a detailed cross sectional view showing a sidewall of impingement cooling zone 200 and an impingement plate 202 attached to the sidewall.

Numerous small apertures, sometimes referred to as impingement cooling holes 201 are present in the impingement plate 202 that direct the cooling air or, generally, cooling medium 206 in a normal direction toward the surfaces of the sidewall. FIG. 2 further shows the outer sidewall 204 as having film cooling holes 205 through which the cooling air within the chamber 203 is discharged at an acute angle to the surface of the sidewall 204 facing the hot gas path of the engine to achieve a film cooling or effusion cooling effect at that surface. Impingement and film cooling techniques are well known in the art, and therefore do not require further explanation.

Additionally, it is possible to dispose an impingement cooling comprising a baffle cooling for wall parts, in which, firstly, the flow-off of the cooling medium transversely to the jet direction does not impair the jet effect. This is achieved by means of a multiplicity of baffle tubes which are arranged with their inlet over an area on a plane or curved carrier and which are directed with their outlet towards the wall part to be cooled, the carrier being arranged at a distance from the wall part. Secondly, through the axial inflow of the cooling medium in this zone is achieved that the baffle jets deflected after the impact can now flow off unimpeded in the free interspace between the baffle-tube outlet and the carrier located at a distance corresponding to the length of the baffle tubes.

Figure 3:
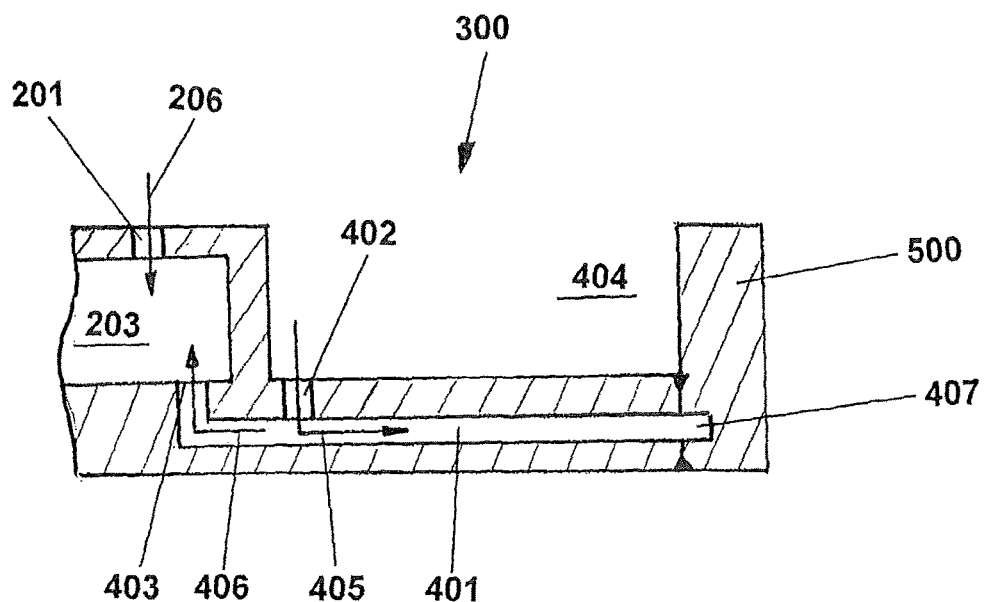
FIG. 3 shows a sectional view along a channel in connection with the discharge of the cooling air to an impingement cooling section.

FIG. 3 shows cooling channels 401 that are applied in the wall of the transition piece 100 at the interface to the closing plate 500, as indicated in FIG. 1. The cooling channels, as part of the cooling channel structure 400 (see FIG. 5), could be drilled in or eroded into the existing sequential disposed liner 300 of the transition piece 100. The proposed cooling path is realized by creating openings 402 of these near-wall cooling channels 401 to the outer combustor air plenum 404 and openings 403 to the space inside the impingement chamber 203. The individual cooling channels 401, which run in a serpentine manner, are connected via a slot that is drilled in the closing plate 500. With this arrangement a driving pressure drop over the cooling channels can be created to drive the cooling mediums 405, 406 without leaking directly into the combustion chamber as indicated in FIGS. 3 and 4.

Referring to FIG. 3 on the side of the closing plate 500 the cooling channels 401 redistribute the cooling medium 405 among one another being actively connected to an annular space 407.

Figure 4:
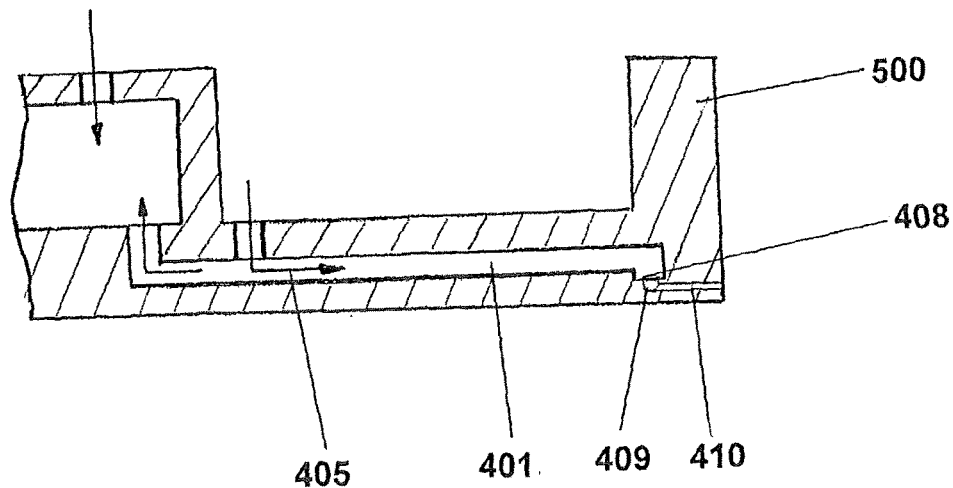
FIG. 4 shows a sectional view along a channel in connection with the discharge of the cooling air to an impingement cooling section and additionally a recess with a cavity on side of the closing plate.

Referring to FIG. 4 on the side of the closing plate 500 the cooling channels 401 redistribute the cooling medium 405 among one another being actively connected to an annular space formed as a recess 408, and the recess comprising in the circumferential direction of the closing plate 500 at least one cavity 409.

The mentioned cavity 409 according to FIG. 4 comprising at least one aperture 410 through which inspection of the interior of the recess is made possible. The aperture 410 is dimensioned in such a manner that it simultaneously forms a dust discharge aperture for dust or dirt particles contained in the cooling medium 405. By a "dust discharge aperture" there is to be understood here an aperture in the wall of the component by means of which particles entrained in the cooling medium emerge from the interior of the component due to their inertia. A dust discharge aperture must therefore inevitably be arranged at a deflection of the annular space conducting the cooling medium or at the end of a dust cavity branching from this annular space at a corresponding deflection. Such dust discharge apertures are already used in components of flow machines in order to prevent a blockage of the antecedent cooling channel paths. Particles entering with the cooling air are conveyed, due to the cooling force directly in a straight line radially to this cavity and this dust discharge aperture or hole, while nearly dirt-free air can enter the other serpentine channels without problems. The dust particles are thus conducted out of the cavity through this dust discharge aperture or this dust hole, so that the cooling air bores proper cannot be blocked by the dust particles. The dust hole can fulfill the function of dust discharge apertures, or that dust discharge apertures, by suitable dimensioning, particularly enlargement, can serve as inspection access apertures. The dust discharge apertures are here designed in size and position both so that dust is favorably discharged and also an aperture with sufficient diameter is formed in order to be able to introduce a bore-scope through this aperture. In order to be able to inspect these arrangements even in the built-in state of the machine, these inspection and dust discharge apertures are to be arranged approximately parallel to the machine axis, if the inspection tool is to be introduced in the hot gas path of the gas turbine. If the inspection tool is to be introduced radially into the machine, a position at the arrangement tip is more favourable in which the inspection and dust discharge aperture runs radially of the machine axis. By the combination according to the invention of the dust discharge and the inspection function in one and the same aperture, unnecessary apertures are avoided which can lead to an undesired loss of cooling medium and thus bring about a loss of efficiency.

The advantages of the present provisions are to be seen inter alia in that, now, an intensive cooling with the smallest possible quantity of cooling medium and with a low pressure drop is achieved. This in turn affords the possibility of implementing the classic baffle film arrangements with an enlarged film area. The film hole rows can then, in the case of flow-round components, be arranged at the locations having a lower external pressure.

Moreover, if the cooling medium circulates in a closed circuit, higher cooling pressures can be brought about, with the result that the heat transmission coefficient can be increased. This is the case inter alia when steam is used as the cooling medium, this becoming possible in combination installations. An advantage of this is that the higher pressure of the cooling medium is then generated beneficially in energy terms in the feed pump instead of in the compressor.

The above described closed loop cooling can as necessary converted to a semi closed loop cooling, by introducing an effusion cooling on the basis of the direction of the cooling air flow in the cooling channels as showed in FIG. 2.

Figure 5:
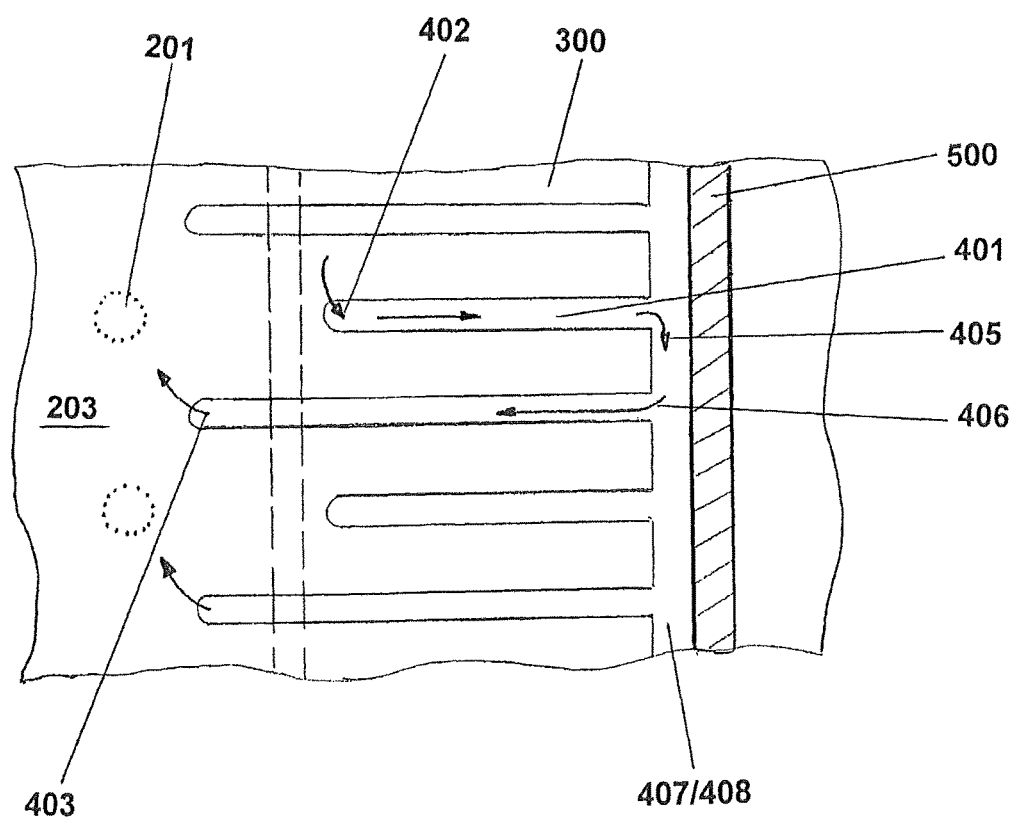
FIG. 5 shows an overview of a part of the transition piece of a combustor regarding the serpentines of the air cooling channels.

FIG. 5 shows the structure of the cooling channels 401. The cooling mediums 405, 406 circulate in a closed circuit. The cooling channels, which extend through the thickness of the sequential disposed liner 300 of the transition piece, can have any suitable cross-sectional size or shape. For instance, the cooling channels can be circular, oval, slotted, rectangular, triangular, or polygonal. The cooling channels are applied in the wall of the transition piece of the combustor in one or more circumferentially subsequently disposed section on the transition piece. The circumferentially disposed channel section may also be intermediately broken or overlaid with an adjacent section.

Figure 6:
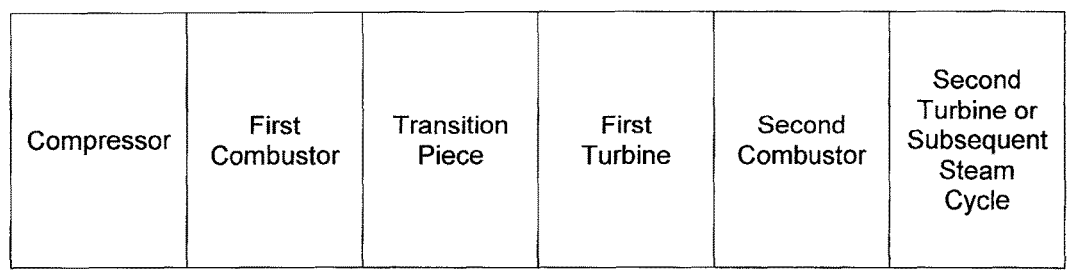
FIG. 6 shows a second combustor, and a second turbine/subsequent steam cycle in accordance with an exemplary embodiment of the application.

FIG. 6 shows a gas turbine including a compressor, a first combustor downstream of the compressor, a transition piece, a second combustor, and a second turbine or subsequent steam cycle.

The invention claimed is:
1. A combustor of a gas turbine, comprising:
   a combustor air plenum;

a transition piece including an impingement cooling zone having an impingement plate including a plurality of impingement cooling holes and attached to a sidewall of the transition piece in the impingement cooling zone wherein the impingement cooling holes open to the combustor air plenum;

a chamber between the impingement plate and the sidewall;

a sequential disposed liner having at least one cooling arrangement; and a closing plate including an annular space arranged at a single axial location of the combustor, wherein the sequential disposed liner has cooling channels, wherein the cooling channels are operatively connected to a cooling medium to cool at least one part of the sequential disposed liner, wherein the cooling channels extend through a thickness of the sequential disposed liner of the transition piece, and into the annular space on a side of the closing plate, wherein the cooling channels run in a serpentine manner, are connected to the annular space and are configured to redistribute the cooling medium among one another, wherein the cooling channels are arranged in a wall of the sequential disposed liner in at least one circumferentially disposed section and wherein the cooling channels are connected to redistribute the cooling medium among one another by being connected to the annular space formed in the closing plate, the cooling channels including cooling medium inlet openings arranged upstream of the annular space with respect to a hot combustion gas flow.

2. The combustor according to claim 1, wherein the cooling channels are configured to cool at least one part of the closing plate.

3. The combustor according to claim 1, wherein the cooling medium travels to the impingement cooling holes in the impingement plate after completion of a cooling operation along the cooling channels.

4. The combustor according to claim 1, wherein the annular space has a recess in a circumferential direction of the sequential disposed liner.

5. The combustor according to claim 1, wherein the annular space comprises at least one cavity for collecting dust particles.

6. The combustor according to claim 5, wherein the at least one cavity is operatively connected to an aperture for discharging the collected dust particles from the at least one cavity.

7. The combustor according to claim 1, wherein the at least one cooling arrangement operates on the basis of a convective cooling.

8. The combustor according to claim 1, wherein the at least one cooling arrangement operates on the basis of a convective and an effusion cooling.

9. The combustor according to claim 1, wherein the at least one cooling arrangement within the impingement cooling zone operates on the basis of an impingement, an effusion and/or a convective cooling.

10. A gas turbine arrangement, comprising:
the combustor as claimed in claim 1;
a compressor;
wherein the combustor is arranged downstream of the compressor wherein the transition piece is disposed within an intermediate zone of the combustor, and wherein hot gases of the combustor are admitted to a turbine, and the combustor has an annular or a can-combustor architecture.

11. A gas turbine arrangement, comprising:
the combustor as claimed in claim 1, wherein the combustor is a first combustor;
a compressor; and
wherein the first combustor is arranged downstream of the compressor wherein the transition piece is disposed within an intermediate zone of the first combustor and wherein hot gases of the first combustor are admitted to a first turbine and a second combustor, hot gases of the second combustor are admitted to a second turbine or to a subsequent steam cycle; and at least one or both of the first combustor or the second combustor has an annular or a can-combustor architecture.

12. The gas turbine arrangement as claimed in claim 11, wherein the first combustor has an annular combustion chamber comprising a plurality of premixing burners or semi-premixing burners, the first turbine connected to receive the hot gases from the first combustor, the second combustor is connected to receive the exhausted hot gases from the first turbine and to deliver the exhausted hot gases to the second turbine, wherein the second combustor comprises an annular duct forming a combustion space extending in a flow direction from an outlet of the first turbine to an inlet of the second turbine, and means for introducing a fuel into the second combustor for self-ignition combustion.

13. The gas turbine arrangement as claimed in claim 11, wherein at least one of the first combustor and the second combustor are single can-combustors or separated can-combustors.

* * * * *